April 14, 1953  R. J. KUTZLER  2,634,925
CONTROL APPARATUS FOR AIRCRAFT
Filed March 13, 1948  2 SHEETS—SHEET 1

Fig. 1a.

Inventor
ROBERT J. KUTZLER
BY George H. Fisher
Attorney

Patented Apr. 14, 1953

2,634,925

UNITED STATES PATENT OFFICE 2,634,925

CONTROL APPARATUS FOR AIRCRAFT

Robert J. Kutzler, Minneapolis, Minn., assignor to Minneapolis-Honeywell Regulator Company, Minneapolis, Minn., a corporation of Delaware Application March 13, 1948, Serial No. 14,787

18 Claims. (Cl. 244—77)

This invention pertains to flight control apparatus for an aircraft. An embodiment of the invention as illustrated has been applied to the control of an aircraft of the flying wing type. Although adapted in its preferred form to the control of an aircraft of the flying wing type, the invention nevertheless may be applied to other types of aircraft.

The flying wing as its name implies is a form of aircraft which is comprised principally of a wing section and does not have the extended fuselage and tail section as in the conventional types of aircraft.

Control of the flying wing about the vertical axis is obtained by means of two rudders. A rudder is placed at the extremity of each wing at the trailing edge thereof. The rudders are separately operated to increase the drag in the portion of the wing in which they are mounted and the increased drag on the wing having the operated rudder serves to give control about the turn axis of the plane. Control of the flying wing about the roll and pitch axes is obtained by control surfaces called elevons. One elevon is mounted in each wing inboard of the rudder and in the trailing edge of the wing. The elevons are operated at times in the same direction to give the conventional elevator action to the aircraft. On other occasions the elevons may be operated in opposite directions to apply the aileron action to the aircraft. Means have been provided for operating the rudders and elevons.

The flying wing in the embodiment of my invention illustrated is stabilized about its turn, roll, and pitch axes by a directional gyroscope and a vertical gyroscope. The directional gyroscope stabilizes the aircraft about the turn axis by applying rudder movement only for small deviations. For large deviations about the turn axis the directional gyroscope applies aileron as well as rudder corrections.

The directional gyro stabilizes the aircraft about the turn axis, as stated, and therefore stabilizes the heading of the aircraft. In general the heading of the aircraft is the same as the direction in which the aircraft is moving relative to its surrounding air or supporting medium. However, under certain conditions the aircraft may be moving in a different direction relative to the air from that in which its longitudinal axis is headed. Under such conditions the aircraft is in yaw or is said to be yawed. As long as the heading is maintained constant, the directional gyroscope which stabilizes the craft on a heading will not sense any difference between the heading of the aircraft and the direction in which it is moving. Means have been provided that senses when the aircraft is not heading in the direction in which it is moving. This means for sensing differences between the heading and the direction in which the aircraft is going is also utilized to apply corrective movement to the rudders of the aircraft whereby the aircraft is forced to head in the direction in which it is moving. Any resulting attempt to compel the aircraft to change heading and to head in the direction in which it is going to thereby remove yaw will also cause a corrective movement to be applied to the rudder from the directional gyro. Since the correction from the directional gyro due to change of heading resulting from correction of yaw and applied to the rudders would be opposed to that applied by the means for sensing the difference between the heading and the direction in which the aircraft is going, it is an object of this invention to provide the yaw sensing means with an arrangement for overriding any control exerted by the directional gyro on the rudders in response to such change in heading.

Since the overriding feature of the yaw control has through the rudders compelled the aircraft to change its heading, means have been provided whereby the directional gyro responding to the change in heading effects operation of the ailerons to bank the aircraft causing it to turn and to restore the aircraft to its original heading.

Many aircraft have a tendency to assume the yawed condition in flight that is a condition in which they are not headed in the direction in which they are moving due to some inherent structural condition of the aircraft. The yawed condition of the aircraft may be corrected by operating one or the other rudders to cause the aircraft to head in the direction in which it is going. Since such movement or displacement of the rudder must necessarily be permanent if the yawed condition is to be permanently corrected it is desirable that some means be provided for maintaining a rudder in a displaced position from its normal position.

A further object therefore of this invention is to provide means for sensing when yaw exists in the flight of the aircraft and to provide a permanent displacement of the rudder to permanently correct for the yawed condition.

Another condition arising during the flight of an aircraft which requires a permanent displacement of the control surfaces of the aircraft is known as unsymmetrical power. Unsymmetrical power occurs in multi-engine aircraft when the motors on one side of the longitudinal axis of the aircraft differ in power output from those motors on the other side of the longitudinal axis of the aircraft. When the power output of the motors on opposite sides of the longitudinal axis is not the same, the aircraft will tend to turn toward the side having the least power. The presence of unsymmetrical power not only causes the aircraft to turn toward the side having the lesser power, but the wing on the side of less power also begins to drop. The dropping of the wing results from the loss in lifting power of the wing. The lifting power decreases probably because the speed of the air over the wing which is aided by the propeller slip stream decreases on power change of motors. Since the condition of unsymmetrical power requires not only a correction for the tendency of the aircraft to turn about the vertical axis and also for a tilting of the wing about the longitudinal or roll axis, means have been provided to apply permanent corrections for these conditions.

The condition of unsymmetrical power manifests itself at the outset by a veering of the aircraft about the turn axis. Such veering or change in heading will be sensed by the directional gyro which effects operation of the rudder to check such change in heading. Since it is desired to anticipate any movement of the aircraft about the roll axis, means have been provided whereby a signal from the directional gyro causes the operation of the aileron operating means to apply proper aileron to anticipate any change in the lateral attitude of the aircraft. Since the means for preventing changes in lateral attitude or tilting of the aircraft about the roll axis must provide in this instance a permanent correction, it is a further object of this invention to provide means for applying a permanent displacement of the ailerons of the aircraft to compensate for any tendency to alter the lateral attitude of the aircraft.

Correction for the existence of unsymmetrical power requires not only a permanent displacement of the ailerons but also requires a permanent displacement of a rudder on the aircraft. Anticipating corrections for tilt about the roll axis have been generally described as being controlled by the directional gyro. It would appear that even with the tilt about the roll axis of the aircraft corrected that the aircraft nevertheless would have a tendency to turn about the turn axis owing to unsymmetrical power. Where the aircraft is turning as stated due to unsymmetrical power but retains its lateral attitude in flight, the aircraft may skid due to the centrifugal effect of the turning action. However, when the aircraft skids, it is in a condition of yaw; and the presence of yaw is immediately detected by the yaw sensing means. The yaw sensing means effects the operation of the rudders to correct for any yawed condition. In the means employed, the yawed condition is corrected by a permanent displacement of the rudder so that the condition for unsymmetrical power is corrected by a permanent displacement of the rudder as well as the ailerons. The directional gyro also senses turning from the desired heading and applies corrective rudder movement.

The aircraft is provided as stated with apparatus for stabilizing it about the turn, roll, and pitch axes. In addition to automatic stabilization, means have been provided whereby the aircraft may be manually controlled about the turn and roll axes through the operating means which position the control surfaces. The operating means for the control surfaces may therefore be controlled through the automatic stabilizing devices or by manually operated devices.

Another object of this invention is to provide resetting devices for the means which apply permanent compensating correction to the turn axis control surface and to the roll axis control surface. These resetting devices are selectively operable so that if the cause of a condition is removed the control surfaces may be returned to a normal position.

Further objects of the invention may be ascertained by reference to a detailed description of the invention and the drawing showing a preferred embodiment thereof wherein.

*Turn axis control*

Figure 1A:
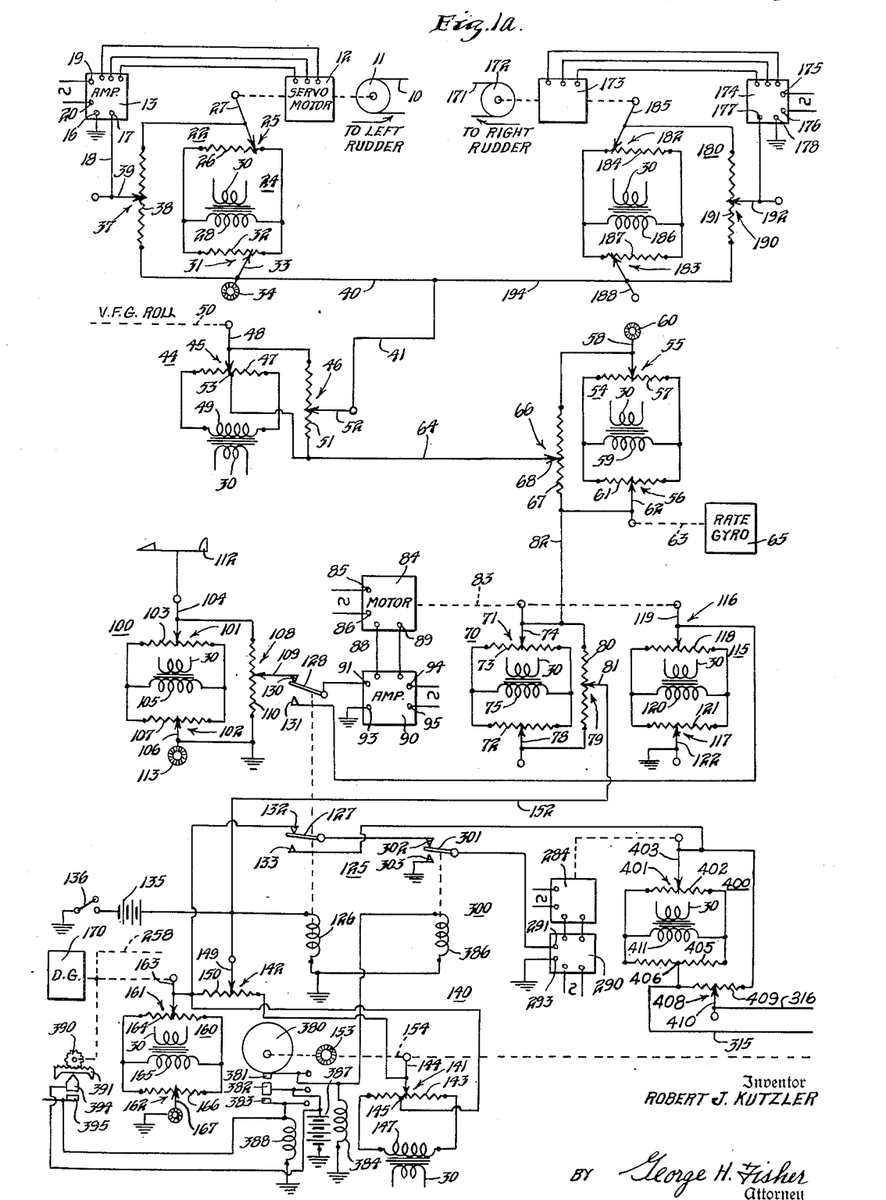
Figures 1A and 1B show a schematic arrangement of apparatus for controlling an aircraft in flight.
Figure 1B:
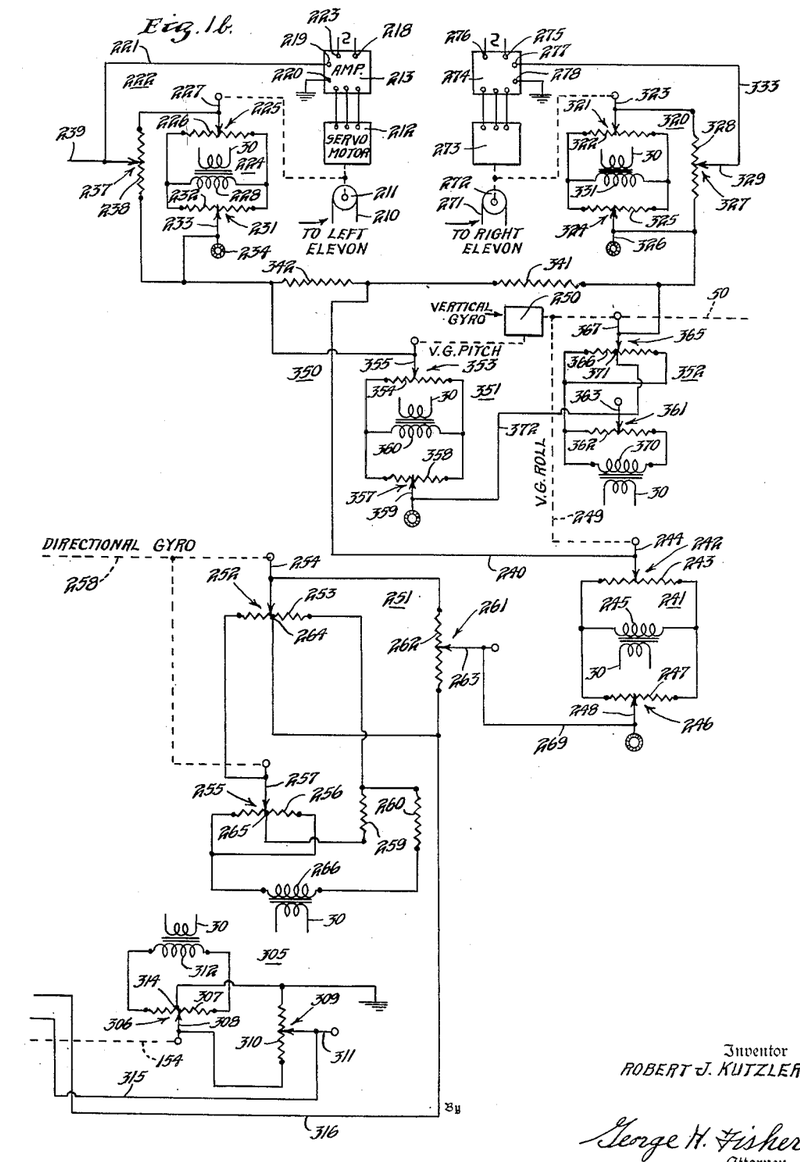

As stated previously turn axis control of the flying wing about the turn axis is obtained by two so-called rudders (not shown) which are mounted in the extremities of the wings. One rudder is provided near each tip of the wing. The function of each rudder is merely to increase the frontal resistance of the portion of the wing in which it is mounted. For this reason each rudder may consist of two vanes which may be projected one above and one below the surface of the wing perpendicular to the air stream to thereby increase the drag of such wing in flight. In the apparatus to be described, arrangements have been provided whereby only one rudder is in operated position at one time.

Considering the operating means for each rudder, the left rudder is actuated by cables 10 extending from a cable drum 11. The cable drum 11 is driven by a rudder servomotor 12. The servomotor 12 is reversibly controlled by a left servomotor amplifier 13. The amplifier 13 is supplied with an input control signal obtained from an input circuit which includes active components comprising a servo-balance and aligning network 22, a vertical gyro rudder network 44, a rate gyro and aligning network 54, a yaw rudder bridge 70, a turn control network 140, and a directional gyro rudder and centering bridge 160.

The right rudder is connected to cables 171 extending from a cable drum 172 which in turn is driven by a right rudder servomtor 173. The right rudder servomotor is reversibly controlled by the right servomotor amplifier 174. The right rudder servomotor amplifier is supplied with a control signal from a network which includes active components comprising a right rudder servo-balance and aligning network 180, the vertical gyro rudder network 44, the rate gyro and aligning network 54, the yaw rudder bridge 70, the rudder turn control network 140, and the directional gyro rudder and centering bridge 160.

The servomotor 12 and the amplifier 13 which reversibly controls its direction may be of the type disclosed in application 447,989 filed June 22, 1942 or that disclosed in U. S. Patent 2,425,733 issued August 19, 1947. As disclosed in the aforesaid application the amplifier 13 may reversibly control the motor 12. The direction of rotation of the servomotor 12 depends upon the phase relationship between the voltage applied to signal input terminals 16, 17 of amplifier 13 and that across the terminals 19 and 20 connected to a source of alternating voltage which may be the inverter, not shown, of the aircraft. The right rudder servomotor 173 and its amplifier 174 are similar to that provided for the left rudder.

The left rudder servo-balance and aligning network 22 comprises a servo-balance and aligning bridge 24. The bridge 24 comprises a servo-balance potentiometer 25 having a wiper 27 and a resistor 26. The resistor 26 forms two arms of the bridge 24 and it is connected across the ends of a secondary winding 28 of a transformer having a primary winding 30. The wiper 27 is operatively connected to the servomotor 12. The opposite two arms of the bridge 24 comprise an aligning potentiometer 31 having a resistor 32 and a wiper 33. The resistor 31 is connected across the ends of secondary winding 28 and parallel to the resistor 26 of potentiometer 25. The aligning wiper 33 may be positioned by a manual control knob 34. The network 22 also includes a rudder ratio or voltage dividing potentiometer 37 having a resistor 38 and a wiper 39. The resistor 38 is connected across the wipers 27 and 33 of the servo-balance potentiometer 25 and the aligning potentiometer 31 respectively. The wiper 39 which is manually adjustable is connected by means of lead 18 to one input terminal 17 of amplifier 13.

The vertical gyro rudder network 44 includes a vertical gyro roll operated potentiometer 45 and a roll trimmer potentiometer 46. The potentiometer 45 comprises a resistor 47 and a wiper 48. The resistor 47 is connected across the ends of a secondary winding 49 of a transformer having a primary winding 30. Since in the several networks to be described several secondary windings may have a common primary winding the same reference character is used to indicate in each instance the primary winding of the transformer. The wiper 48 of potentiometer 45 is driven through an operative connection 50 by a vertical flight gyro, to be described. The potentiometer 46 comprises a resistor 51 and a wiper 52. One end of resistor 51 is connected to a center tap 53 of resistor 47. The other end of resistor 51 is connected to wiper 48 of potentiometer 45. The wiper 52 which may be manually adjusted as desired along resistor 51 is connected through leads 41 and 40 to wiper 33 of the aligning potentiometer 31.

The rate gyro network 54 includes an aligning potentiometer 55, a rate gyro operated potentiometer 56 and a voltage dividing potentiometer 66. The potentiometer 55 has a resistor 57 which is connected across the ends of a secondary winding 59 of a transformer to form two arms of a bridge. The transformer has a primary winding 30. Potentiometer 55 includes a wiper 58 which may be manually adjusted over the surface of resistor 57 by a knob 60. The potentiometer 56 includes a resistor 61 and a wiper 62. The resistor 61 is connected across the ends of secondary winding 59 to thereby form the other two arms of the bridge. A rate of turn gyro 65 through an operative connection 63 adjusts the wiper 62 over the surface of resistor 61. The rate gyro 65 may be of the type well known in the art which is responsive to the rate of turn of the aircraft and which upon turning of the aircraft will precess and through the operative connection 63 will position the wiper 62 in proportion to the rate of turn of the craft. The voltage dividing potentiometer includes a resistor that is connected across wipers 58 and 62. Wiper 68 of the voltage dividing potentiometer 66 is connected by means of lead 64 to the end of resistor 51 in network 44 that in turn is electrically connected to center tap 53.

The yaw rudder network 70 includes a yaw motor operated potentiometer 71 and a resistor 72. Potentiometer 71 includes a resistor 73 and a wiper 74. Resistor 73 is connected across the ends of a secondary winding 75 of a transformer to form two arms of a bridge. The secondary winding 75 is supplied by a primary winding 30. Wiper 74 may be positioned along the surface of resistor 73. Resistor 72 is connected across the ends of the secondary winding 75 to form the opposite two arms of the bridge. Included in the network 70 is a trimmer or voltage dividing potentiometer 79. The potentiometer 79 includes a resistor 80 and a wiper 81. One end of resistor 80 is connected to wiper 74 and the opposite end of resistor 80 is connected to a wiper 78. Wiper 74 is electrically connected through lead 82 to wiper 62 of the rate gyro operated potentiometer 56.

Wiper 74 of potentiometer 71 is adjusted through an operative connection 83 extending from a yaw motor 84 to be described. The yaw motor 84 may be a conventional reversible type split phase capacitor induction motor. The motor 84 has terminals 85 and 86 connected to one winding and terminals 88 and 89 connected to the other winding. The terminals 85 and 86 are connected to the source of alternating voltage. Terminals 88 and 89 are connected to the output terminals of an amplifier 90. The amplifier 90 has signal input terminals 91, 93 and terminals 94, 95 which are connected to the source of alternating voltage. The yaw motor 84 and the amplifier 90 may be similar to that disclosed in the U. S. patent to Anschutz-Kaempfe No. 1,586,233. In such amplifier and motor combination the direction of rotation of the motor 84 depends upon the phase relationship between the voltage applied to the signal input terminals 91, 93 of amplifier 90 and the voltage across terminals 94 and 95 of the amplifier which are connected to the source of voltage.

Continuing with the elements operating the rudder network 70, the amplifier 90 may have its signal input terminals 91, 93 connected to a yaw pickup network 100. The vane network 100 includes a vane operated potentiometer 101 and an aligning potentiometer 102. The potentiometer 101 includes a resistor 103 and a wiper 104 adjustable thereover. The wiper 104 is operatively driven by a vane 112 which is rotatably carried by the aircraft so as to align itself with the direction in which the craft is moving. Resistor 103 is connected across the ends of a secondary winding 105 of a transformer having a primary winding 30. Potentiometer 102 comprises a wiper 106 and a resistor 107. The resistor 107 is connected across the ends of secondary winding 105 in parallel with resistor 103 to thus form a Wheatstone bridge. The output of the bridge is developed across the wipers 104 and 106. The wiper 106 may be manually adjusted by a knob 113. A vane trimmer potentiometer 108 has its resistor 110 connected across the wipers 104 and 106. The potentiometer 108 includes an adjustable tap 109 which may be manually positioned along resistor 110. One end of the voltage dividing resistor 110 is connected to ground.

The signal input terminals 91 and 93 of amplifier 90 may also be connected to a yaw motor reset network 115. The network 115 includes a yaw motor operated potentiometer 116 and an aligning potentiometer 117. The potentiometer 116 includes a resistor 118 and a wiper 119 positionable over said resistor. The resistor 118 is connected across the ends of a secondary winding 120 of the transformer to thereby form two arms of a bridge. The secondary winding 120 is supplied from a primary winding 30 of the transformer. The potentiometer 117 includes a resistor 121 and a wiper 122 manually adjusted over said resistor. The resistor 121 is connected across the ends of secondary winding 120 in parallel with the resistor 118 to thereby form the opposite two arms of the bridge.

The alternative connection of terminals 91, 93 of amplifier 90 to network 100 or reset network 115 is controlled by a relay 125. The relay 125 comprises an operating coil 126 and operable relay arms 127, 128. The upper arm 128 coacts with two spaced contacts 130 and 131. The switch arm 127 coacts with two spaced contacts 132, 133. Coil 126 is energized from a battery 135 through a single pole single throw yaw reset switch 136.

Reverting to the description of the remaining component parts of the input signal network for amplifier 13, the rudder turn control network 140 includes a manual turn control operated potentiometer 141 and a trimmer potientiometer 142. The potentiometer 141 comprises a resistor 143 and a manually adjustable wiper 144. The resistor 143 is connected across the ends of the secondary winding 147 of a transformer having a primary winding 30. The rudder turn control trimmer potentiometer 142 includes a resistor 150 and a wiper 149. The resistor 150 has one end connected to wiper 144 and has its opposite end connected to a broad center tap 145 of resistor 143. Wiper 149 of the trimmer potentiometer is selectively connected by means of lead 152 to the adjustable tap 81 of the yaw rudder bridge network 70. The wiper 144 is adjustable through an operative connection 154 extending from a manual turn control knob 153.

The directional gyro rudder and centering bridge network 160 includes a directional gyro operated rudder potentiometer 161 and a centering potentiometer 162. The potentiometer 161 comprises a wiper 163 and a resistor 164. The resistor 164 is connected across the ends of a secondary winding 165 of a transformer to form two arms of a Wheatstone bridge. The centering potentiometer 162 includes a resistor 166 and a manually adjustable wiper 167. The resistor 166 is connected across the ends of secondary winding 165 in parallel with resistor 164 to constitute the other two arms of the Wheatstone bridge. Wiper 163 of potentiometer 161 is electrically connected to one end of resistor 150 of the trimmer potentiometer 149. Wiper 163 is also operatively driven by a directional gyro 170. The directional gyro 170 may be of the type disclosed in the aforesaid application and in which movement proportional to deviation of the aircraft from a desired direction about its turn axis applies a movement to wiper 163 relative to resistor 164. The manually adjustable wiper 167 is connected to ground. Since terminal 16 of amplifier 13 is also connected to ground the input circuit is thereby completed.

The right rudder, as stated, is connected to control cables 171 which extend from a cable drum 172. The cable drum 172 is reversibly driven by a right rudder servomotor 173. The servomotor 173 is reversibly controlled by an amplifier 174. The amplifier 174 has terminals 175 and 176 connected to a source of alternating voltage which may be the inverter, not shown, of the aircraft. The terminals 177 and 178 constitute the signal input terminals of amplifier 174. The input circuit connected to terminals 177 and 178 of amplifier 174 as previously stated includes a servo-balance and aligning network 180.

The servo-balance and aligning network 180 includes a servomotor operated potentiometer 182 and an aligning potentiometer 183. The potentiometer 182 includes a resistor 184 which is connected across the opposite ends of a secondary winding 186 to form two arms of a Wheatstone bridge and a wiper 185 which is operatively driven from the servomotor 173. The potentiometer 183 comprises a resistor 187 which is connected across the ends of secondary winding 186 in parallel with resistor 184 to form the other two arms of the bridge and a manually adjustable wiper 188. The secondary winding 186 is supplied from a primary winding 30 of the transformer. The network 180 includes a right rudder ratio potentiometer 190. The potentiometer 190 consists of a resistor 191 and a wiper 192. The resistor 191 is connected across the wipers 185 and 188 to form the voltage dividing resistor for the output of the bridge. The manually adjustable tap 192 is connected to input terminal 177 of amplifier 174. Wiper 188 of the aligning potentiometer 183 is electrically connected through leads 194 and 41 to adjustable tap 52 of the trimmer potentiometer 46 of network 44.

Since the remaining elements of the input circuit to amplifier 174 are also part of the input circuit of amplifier 13 and since these elements had been previously described their coaction with the servo-balance network 180 may be considered similar to their coaction with network 22 in the input circuit to amplifier 13.

Roll axis control

Control of the aircraft about the roll axis is obtained from two elevons. As stated previously one elevon is mounted in each wing. The left elevon, not shown, is connected to operating cables 210 extending from a cable drum 211. The cable drum 211 is driven by the left elevon servomotor 212. The servomotor 212 in turn is controlled by the left elevon servomotor amplifier 213. The amplifier servomotor arrangement is similar to that provided for the operation of the rudders of the aircraft.

The amplifier 213 has an input control circuit that includes active components comprising a servo-balance and aligning network 222, a vertical gyro bank and centering bridge network 241, a directional gyro banking network 251, a directional gyro motorized network 400 and a turn control aileron network 305. As in the case of the rudder servomotor amplifier arrangements, the direction of rotation of the left elevon servomotor depends upon the phase relationship between the voltage across the signal input terminals 219, 220 of amplifier 213 and the voltage across terminals 218, 223 of amplifier 213 which are connected to a source of voltage such as an inverter, not shown, of the aircraft.

The right elevon, not shown, is operatively connected to cables 271 extending from the right servomotor cable drum 272. The cable drum 272 is driven by the right elevon servomotor 273. The servomotor 273 is electrically connected to an amplifier 274. The servomotor amplifier combination is similar to that provided for the operation of the left elevon. The amplifier 274 has signal input terminals 277 and 278. Amplifier 274 has additional terminals 275 and 276 which are connected to a source of alternating voltage which may be the inverter of the aircraft. As in the left elevon servomotor and amplifier arrangement, the direction of rotation of the servomotor 273 depended upon phase relationship between the voltage across the signal input terminals 277, 278 and the voltage across the terminals 275, 276. The signal input circuit includes active components comprising a servo-balance and aligning network 320, the vertical gyro banking and centering network 241, the directional gyro banking network 251, the directional gyro motorized network 400, and the turn control aileron network 305.

Reverting to the input network for amplifier 213, the servo-balance and aligning network 222 includes a Wheatstone bridge 224. The Wheatstone bridge 224 consists of a servomotor operated potentiometer 225 and an aligning potentiometer 231. The potentiometer 225 consists of a resistor 226 which is connected across a secondary winding 228 of a transformer, and a wiper 227 operatively driven by the servomotor 212. The secondary winding 228 is supplied from a primary winding 30 of the transformer. The potentiometer 231 consists of a resistor 232 connected across the ends of secondary winding 228 in parallel to resistor 226 and a wiper 233 which may be manually positioned by knob 234. The wipers 227 and 233 constitute the output members for the bridge 224. The network 222 includes a left elevon ratio potentiometer 237. This potentiometer consists of a resistor 238 and an adjustable tap 239. The resistor 238 is connected across the output members 227, 233 of the bridge 224. The adjustable tap 239 is connected by means of lead 221 to a signal input terminal 219 of amplifier 213.

The vertical gyro banking and centering network 241 includes a vertical gyro roll axis operated potentiometer 242 which consists of a resistor 243 and an adjustable wiper 244 and a centering potentiometer 246 consisting of a resistor 247 and a manually adjustable wiper 248. The resistor 243 is connected across the ends of a secondary winding 245 of a transformer having a primary winding 30. The resistor 247 is connected across the ends of the secondary winding 245 in parallel with the resistor 243 and as thus connected the two potentiometers 242 and 246 constitute a Wheatstone bridge. The output members of the bridge are the wipers 244 and 248. Wiper 244 is connected by means of a lead 240 and a resistor 342 to one end of resistor 238 of potentiometer 237. The wiper 244 is operatively driven through a connection 249 by a vertical flight gyro 250. The vertical flight gyro 250 may be of the type well known in the art whose rotor is mounted for rotation about a vertical axis which axis may be maintained in a vertical position during flight by known suitable gravitational responsive means. The rotor also is mounted to have a rotation about two horizontal axes that are respectively perpendicular to each other and to the rotational axis of the rotor. The vertical gyro 250 is so mounted in the aircraft that it applies movement to wiper 244 with respect to resistor 243 upon the aircraft tilting about its roll axis.

The directional gyro banking network 251 includes a first directional gyro operated potentiometer 252 consisting of a resistor 253 and a wiper 254; a second directional gyro operated potentiometer 255 consisting of a resistor 256 and a wiper 257; a fixed resistor 259; a fixed resistor 260; and a trimmer potentiometer 261 consisting of a resistor 262 and an adjustable tap 263. The opposite ends of resistor 256 are connected to the same end of a secondary winding 266 of a transformer having a primary winding 30. The resistor 256 has a center tap 265 which is connected through resistors 259 and 260 placed in series to the opposite end of secondary winding 266. Resistor 253 of potentiometer 252 has one end connected to wiper 257 of potentiometer 255. The opposite end of resistor 253 is connected to the junction between resistors 259 and 260. The resistor 262 of the bank trim potentiometer 261 is connected across the wiper 254 and a center tap 264 of resistor 253. Wipers 254 and 257 of the first and second directional gyro operated potentiometers are operatively driven through an operative connection 258 by the directional gyro 170 in proportion to the magnitude of the deviation and the direction of the deviation of the craft about the vertical axis. A lead 269 extends from the adjustable tap 263 of the trimmer potentiometer 261 to wiper 248 of the centering potentiometer 246.

The directional gyro motor operated network 400 includes a motor operated potentiometer 401 consisting of a resistor 402 and an operable wiper 403; a resistor 405 having a center tap 406; and a trimmer potentiometer 408 having a resistor 409 and a wiper 410. Resistor 402 of potentiometer 401 is connected across the ends of a secondary winding 411 of a transformer having a primary winding 30. The resistor 405 is connected across the ends of the secondary winding 411 in parallel with the resistor 402. The resistor 409 of the trimmer potentiometer 408 is connected across the wiper 403 and the center tap 406 of resistor 405. A lead 316 extends from wiper 410 to an end of resistor 262 of potentiometer 261. The wiper 403 of potentiometer 271 is operatively driven by a motor 284. The motor 284 is similar to the yaw motor 84. The motor 284 is reversibly controlled by an amplifier 290 which is similar to the amplifier 90 which controls the yaw motor 64. The signal input terminals 291, 293 of amplifier 290 corresponds with the signal input terminals 91, 93 of amplifier 90. The input terminals 291 and 293 are alternatively connectable with the directional gyro rudder network 160 or the directional gyro motor operated network 400. This alternative control of the amplifier 290 by networks 160 or 400 is controlled by the lower pair of contacts 132, 133 and switch arm 127 of relay 125 previously described. The circuit to the signal input terminals 291 and 293 of amplifier 290 is also controlled by a relay 300. This relay 300 consists of an actuating coil 386 and a movable arm 301 which coacts with two spaced contacts 302, 303.

Continuing with a description of the remaining component parts which form the input circuit to left elevon amplifier 213, the turn control aileron network 305 comprises a turn control operated potentiometer 306 having a resistor 307 and a wiper 308, and a trimmer potentiometer 309 consisting of a resistor 310 and an adjustable tap 311. The resistor 307 is connected across the ends of a secondary winding 312 of a transformer having a primary winding 30. The resistor 310 of the trimmer potentiometer 309 has one end connected to a broad center tap 314 of the resistor 307 and has its other end connected to wiper 308 of potentiometer 306. The junction of center tap 314 and resistor 310 is connected to ground. A lead 315 extends from wiper 311 of the trimmer potentiometer to one end of resistor 279 of potentiometer 278. The wiper 308 is operated over resistor 307 by means of an operative connection 154 from a manually operable turn control knob 153. The circuit to the input terminals of amplifier 213 is completed from the grounded connection from the junction of center tap 314 and resistor 310 to the grounded terminal 220 of amplifier 213.

Considering the component parts of the circuit connected to the input terminals 277 and 278 of the right elevon amplifier 274, the network 320 includes a servomotor operated potentiometer 321 consisting of a resistor 322 and a wiper 323 driven by the servomotor 273, an aligning potentiometer 324 consisting of a resistor 325 and a manually operable wiper 326, and a right elevon ratio potentiometer 327 consisting of a resistor 328 and an adjustable tap 329. The resistor 322 is connected across the ends of a secondary winding 331 of a transformer having a primary winding 30. The resistor 325 of the aligning potentiometer is connected across the opposite ends of secondary winding 331 in parallel with resistor 322. Thus potentiometers 321 and 324 are arranged in the form of a Wheatstone bridge with the wipers 323 and 326 constituting the output elements of the bridge. The resistor 328 of the ratio potentiometer 327 has its ends connected across the output elements 323 and 326 of the bridge. A lead extends from the adjustable tap 329 to the input terminal 277 of amplifier 274. A junction of wiper 326 and resistor 328 is connected through a fixed resistor 341 and lead 249 to wiper 244 of the vertical gyro banking and centering network 241.

The remaining components of the aileron or roll axis signal input circuit of amplifier 274 have been described with reference to the input circuit of the left elevon amplifier 213 therefore these components will not again be described.

*Pitch axis control*

Control about the pitch axis of the aircraft is provided by the two elevons. For the purpose of affecting control about the pitch axis the elevons are moved in the same direction rather than in opposite directions as is provided to effect control about the roll axis. The input circuit to amplifier 213 for affecting elevator operation of the left elevon consists of active components comprising network 224 and a composite network 350.

The input control circuit for right elevon amplifier 274 to effect elevator operation of the right elevon consists of active components comprising network 320 and composite network 350.

The network 224 of the input circuit to the left elevon amplifier 213 has been described with reference to the aileron input circuit for that amplifier.

The network 350 comprises a vertical gyro pitch axis and centering network 351, a vertical gyro roll axis up elevator network 352 and two equal fixed resistors 341 and 342. The network 351 comprises a vertical gyro operated potentiometer 353 consisting of a resistor 354 and a wiper 355, and a centering potentiometer 357 consisting of a resistor 358 and a manually adjustable wiper 359. Resistor 354 is connected across the ends of a secondary winding 360 of a transformer having a primary winding 30. Resistor 358 is connected across the ends of secondary winding 360 in parallel with resistor 354. Thus it may be seen that potentiometers 353 and 357 are arranged in the form of a Wheatstone bridge with the wipers 355 and 359 constituting the output members of the bridge. The wiper 355 is operated by the vertical gyro 250 in response to movement of the aircraft about the pitch or lateral axis of the craft. The movements given to wiper 355 are proportional to the magnitude and direction of the movement of the aircraft about the pitch axis.

The vertical gyro up elevator network 352 includes a trimmer potentiometer 361 having a resistor 362 and an adjustable tap 363 and a vertical gyro operated potentiometer 365 consisting of a resistor 366 and an operable wiper 367. Resistor 362 is connected across the opposite ends of a secondary winding 370 of a transformer having a primary winding 30. The two ends of resistor 366 are connected to one end of resistor 362. A center tap 371 of resistor 366 is connected to wiper 363 of the trimmer potentiometer 361. A lead 372 extends from wiper 363 of the trimmer potentiometer 361 to the wiper 359 of the centering potentiometer 357. Fixed resistor 342 has one end connected to one end of resistor 341. The remaining end of resistor 342 is connected to wiper 355 of the pitch axis potentiometer 353. The remaining end of resistor 341 is connected to wiper 367 of the vertical gyro roll axis potentiometer 365. Lead 240 is connected to the junction of resistors 342 and 341. From lead 240 the input control circuit of amplifier 213 extends through components which are inactive with respect to elevator operation and comprise networks 241, 251, 270 and 305 to ground.

As stated previously the input circuit to the right elevon amplifier 274 providing elevator action of the right elevon consists of network 320 and network 350. The network 320 has been previously described with respect to the input circuit of amplifier 274 for providing aileron operation of the right elevon. The network 350 has also been described with reference to the input circuit of the left elevon amplifier 213 for providing elevator action. These prior descriptions may be resorted to if necessary. Like the input circuit to amplifier 213 controlling the left servomotor 212, the remaining portion of the input circuit to amplifier 274 of the right elevon servomotor 273 for providing elevator operation consists of the lead 249, network 241, network 251, network 270, network 305, to ground and to the ground terminal 278 of amplifier 274.

Having described the control networks for the various amplifiers further details of the apparatus will be described hereinafter. Associated with the manually operable turn control knob 153 is a circular cam 380 operatively connected to the turn control knob. Cam 380 is operatively associated with three spaced contacts 381, 382 and 383. A directional arm lock coil 384 has one end connected to the upper spaced contact 381, and the opposite end of coil 384 may be connected to ground. Coil 386 of relay 300 has one end also connected to contact 381 and has its opposite end connected to ground.

The middle contact 382 is connected to one end of battery 387 whose opposite end is connected to ground. An erection cutout coil 388 has one end connected to the lower spaced contact 383 and has its opposite end connected to ground. The directional arm lock coil 384 and the erection cutout coil 388 are operative components of the directional arm lock and the erection cutout mechanism disclosed in the aforesaid application 447,989.

The directional gyro 170, previously described, operates a pinion 390 which is engaged with a rack having a cam member 391. Coacting with the slidable cam member 391 is a depressible contact 394 which may engage a lower contact 395. The depressible contact 394 is connected to battery 387. The lower contact 395 is connected to the ungrounded end of coil 388.

As disclosed in the aforesaid application 447,989 the operation of the directional arm lock coil 384 prevents transmission of movement from the directional gyro 170 to the elements operated thereby such as the wiper 163 of the directional gyro rudder network 160 or the pinion 390 upon operation of the turn control knob 153. In addition, the energization of the coil 388 of the erection cutout mechanism prevents the operation of the erecting means about the roll axis for the vertical flight gyro 250 as disclosed in the aforesaid application.

Having described the details of the elements which constitute the apparatus, it may be desirable to consider the function of the active component parts of the input circuit to the amplifiers. Considering the amplifier 13 for the left rudder servomotor 12. The first component in the input signal circuit to amplifier 13 is network 22. Network 22 includes a Wheatstone bridge 24. If the wipers 27 and 33 are at the same respective positions on their resistors 26 and 32 there will be no potential difference between the wipers 25 and 33. There will thus be no potential drop across the rudder ratio potentiometer resistor 38. If wiper 33 be moved over resistor 32 to alter the relative positions of wipers 33 and 27 a potential difference will exist between the wipers 27 and 33. This potential is applied across the resistor 38. The adjustable tap 39 of the potentiometer 37 may be adjusted along the resistor 37 to select any portion of this potential drop between wipers 27 and 33. The selected voltage drop across resistor 38 is applied on the one hand by means of the adjustable tap 39 to one input terminal 17 of amplifier 13.

In vertical gyro roll network 44 the wiper 48 is normally at the position adjacent center tap 33. If wiper 48 be displaced in either direction from the center tap a voltage drop will appear across the trimmer potentiometer resistor 51. A selected portion of this voltage drop is obtained between the adjustable tap 52 and the lower end of resistor 51. Since the adjustable tap 52 is connected to the lower end of resistor 38 of the rudder ratio potentiometer it is apparent that the selected potential drops from resistor 38 of the rudder ratio potentiometer and from resistor 51 of the trimmer potentiometer 46 are placed in series.

In the rate gyro network 54, the wiper 58 and the wiper 62 are normally at the electrical centers of their respective resistors. If wiper 58 be moved from its electrical center a voltage will be developed across wipers 58 and 62 and therefore across voltage dividing resistor 67. Wiper 63 is connected to the lower end of resistor 51 to thereby place the selected voltage output of the network 54 in series with the voltage drop selected from resistor 51.

In the yaw rudder bridge network 70, wiper 74 is normally at the electrical center of resistor 73 so that the potential of wiper 74 and that of the center tap 78 of resistor 72 are the same. If wiper 74 be displaced from its electrical center a voltage appears across the wiper 74 and center tap 78 which is applied across the trimmer potentiometer 79. The adjustable tap 81 may be positioned along the resistor 80 so that a selected portion of this voltage drop will be obtained between the upper end of resistor 80 and the tap 81. The wiper 62 from the network 54 is connected to the upper end of resistor 80 thereby placing the selected voltage developed across resistor 80 in series with that voltage obtained from the network 54.

In the rudder turn control network 140, the adjustable wiper 144 is normally at the center tap 145 on resistor 143. If the wiper 144 be displaced from the position adjacent the center tap 145, a voltage will exist between the wiper 144 and the center tap which voltage is applied across the trimmer potentiometer resistor 150. The tap 149 may be adjusted along resistor 150 to select the desired portion of this voltage drop. Adjustable tap 149 is connected to adjustable tap 81 of the yaw rudder bridge trimmer potentiometer 79. Thus, the voltage drop from the turn control rudder network 140 as selected is applied in series with the voltage drop from the yaw rudder bridge trimmer potentiometer 79.

In the directional gyro rudder and centering network 160 the wiper 163 and the wiper 167 are normally at the electrical centers of their respective resistors when no potential difference exists between them. If wipers 163 and 167 are relatively displaced from the electrical centers a voltage will exist between them. Wiper 163 is connected to one end of the resistor 150 of the turn control rudder trimmer potentiometer 142. Wiper 167 is connected to ground which is common to the ground terminal 16 of amplifier 13. The voltage developed from network 160 therefore is in series with the voltage developed from the turn control rudder potentiometer and is in series with the voltage developed across all of the networks in the previously described input circuit of the left rudder amplifier 13. If the sum of the voltages in the input circuit of amplifier 13 is equal to zero the amplifier 13 will not operate.

With the circuit in balanced condition as shown, if the manually operable centering wiper 167 of network 160 be displaced to set up a voltage between wiper 167 and wiper 163 the input circuit of amplifier 13 will be unbalanced and the amplifier 13 will operate. The amplifier 13 in turn will control the operation of the servomotor 12. The servomotor 12 operates the servo-balance wiper 27 until such time as the voltage between tap 39 and the lower end of resistor 38 is equal and opposite to the voltage between wipers 163 and 167. When these voltages are equal but opposite the amplifier input circuit will be balanced and the amplifier 13 will cease operation. The servomotor too will stop adjusting the follow-up wiper 27. The operation of the servomotor to position the servo-balance wiper 27 also causes the operation of the left rudder of the aircraft. It is thus seen that the manually operable wiper 167 may be adjusted to cause the positioning of the left rudder as desired. Normally the centering wiper 167 is adjusted so that the left rudder is moved to unoperated position.

Assuming as previously described that the network 160 sets up a voltage in the input circuit of amplifier 13 due to the movement of wiper 167, the amount of movement given to the wiper 27 to balance the input circuit depends upon the position of adjustable tap 39 on the rudder ratio potentiometer resistor 38. If the adjustable tap 39 be moved toward the lower end of resistor 38, it is apparent that only a small voltage drop will be selected from the existing voltage drop across the resistor 38, compared to the voltage that would be obtained if the tap 39 were left as illustrated. With the tap 39 moved toward the lower end of the resistor 38, the servomotor 27 will continue to operate the follow up wiper 27 until such time as the voltage drop obtained between the adjusted tap 39 and the lower end of resistor 38 balances the voltage obtained from network 160. The amount of movement given to the wiper 27 and thus to the left rudder will be increased when the tap 39 is moved toward the lower end of resistor 38 compared to the movement given to wiper 27 if the tap 39 remains as shown. It is also evident that as the tap 39 is moved toward the upper end of resistor 38 that less movement of the wiper 27 by the servomotor 21 will be required to set up a balancing voltage in the input circuit of amplifier 13. By the adjustment of tap 39, it is therefore evident that the amount of movement applied to the left rudder for a given value of initial unbalancing voltage as obtained from the network 160 may be varied as desired. The potentiometer 37 may therefore be used to vary the amount of rudder movement for a given initiating voltage and is therefore termed the rudder ratio potentiometer. The operation of amplifier 174 for the right rudder servomotor 173 is similar to that of the amplifier 13.

The input circuit to amplifiers 13 and 174 for the left rudder and the right rudder are shown as in balanced condition. The amplifiers and their respective servomotors are so arranged that when the conditions are as stated and should a voltage be set up in the input circuits to the amplifiers 13 and 174 which is in phase with the voltage from the inverter one of the servomotors 12 or 173 will be operated the other remaining unoperative. Similarly if with the networks balanced as shown and should a signal which is out of phase be set up in the input circuits of amplifiers 13 and 174 with the voltage from the inverter the other servomotor will be operated to position its rudder. To apply this statement to the apparatus, assume for example that the centering wiper 167 be moved toward the left from its center position. Assume under the half cycle being considered that a positive voltage is applied across the inverter terminals 19 and 20 of amplifier 13 and to the terminals 175 and 176 of amplifier 174. Assume also that the right end of secondary winding 165 in network 160 is positive with respect to the left end. With the wiper 167 as thus moved to the left the wiper 163 will be nearer the positive end of secondary 168 than wiper 167 and will consequently be positive with respect to wiper 167. This voltage being positive is in phase with the voltage applied across the terminals 19 and 20 of amplifier 13 and that applied across terminals 175, 176 of amplifier 174. In its present position, the servomotor 173 will be arranged so that wiper 185 will abut a limit switch as in Figure 2 of the aforesaid application so motor 173 will not operate when an in phase signal is applied to amplifier 174. Servomotor 12 on the other hand will operate upon the application of the in phase signal when the apparatus is as arranged. The servomotor 12 will operate to move the left rudder toward open position and will also move its wiper 27 toward the left. Since the right end of secondary winding 28 like secondary winding 165 is positive with respect to its left end the wiper 27 will be made negative with respect to wiper 33 in network 24. The tap 39 of trimmer potentiometer 37 is therefore negative with respect to the lower end of resistor 38. Thus a negative potential is applied in the input circuit of amplifier 13. When the servomotor 12 adjusts the wiper 27 until the negative voltage between wiper 39 and the lower end of resistor 38 is equal and opposite to the positive voltage obtained from network 160 the input circuit of amplifier 13 will be in a balanced condition.

If now the wiper 167 of network 160 be moved toward the center from its left position it is seen that the in phase signal from network 160 will decrease leaving a preponderant negative or out of phase signal in the input circuit of amplifier 13. In response to the preponderant negative or out of phase signal in its input circuit the amplifier 13 causes the servomotor 12 to rotate in an opposite direction to move the wiper 27 toward the right from its left position. When the voltage obtained from network 160 is balanced by the negative voltage drop across resistor 38 between tap 39 and the lower end of the resistor the amplifier input circuit is again balanced.

It may be seen that until the wiper 167 of network 160 has been moved to the electrical center of resistor 166 that the output voltage from network 160 is still a positive or in phase voltage consequently the servomotor 173 will remain unoperated.

As the wiper 167 is moved back to the center position on resistor 166, the left rudder as controlled by the amplifier 13 and servomotor 12 is moved back to normal position. At this time the input circuit of amplifier 13 is again in balanced condition as shown.

Similarly if with the apparatus as shown, the centering wiper 167 of network 60 is moved toward the right from its center position to set up a negative or out of phase signal in the input circuits of amplifiers 13 and 174, the right servomotor 173 would position the right rudder and the left servomotor 12 due to the abutting position of its follow up wiper 27 and a limit switch, not shown, would be unoperated. By means of the arrangement provided it is apparent that only one rudder will be in an operated position or be displaced from a normal position at one time.

Having considered the operation of the rudder servomotors, the description and operation of yaw motor 94 which drives wiper 74 of network 70 will be discussed.

The input circuit of yaw motor amplifier 90 is connectable with the input terminals 91 and 93, which as presently shown are associated with yaw network 100. If wiper 104 be moved toward the right from its present position it will, in the half cycle being considered, have a positive voltage with respect to wiper 106. The tap 109 of the trimmer potentiometer will be positive with respect to the lower end of resistor 110 which is connected to ground. Wiper 109 is connected to contact 130 of relay 125 which is engaged by switch arm 128. The terminal 91 is connected to switch arm 128 thus a positive or in phase voltage is applied to the input terminals of amplifier 90. The amplifier 90 operates and causes the yaw motor 94 to position wiper 74 of rudder network 70 and wiper 119 of reset network 115 toward the right from their respective central positions. The amplifier 90 will cause the servomotor 84 to operate as long as there is a potential difference across wipers 104 and 106 of the vane pickup network 100. The wiper 119 although moved to the right will become negative with respect to wiper 122 due to the phase arrangement of network 115. The wiper 119 will be positioned as long as motor 84 operates.

If the single pole switch 136 now be operated to energize relay coil 126 of relay 125, the switch arm 128 is moved into engagement with contact 131. The wiper 119 of network 115 is thereby connected to terminal 91 of amplifier 90. The grounded terminal 93 of amplifier 90 is connected through ground to wiper 122 of the reset network 115. A negative or out of phase signal will thereby be applied to the amplifier 90 which causes the yaw motor 84 to now rotate in a reverse direction to move wipers 74 and 119 back toward their center positions. The amplifier 90 will continue to operate as long as wipers 119 and 122 have a difference of potential and while the single pole switch 136 is closed. The wiper 74 of the network 70 is thus returned to its center position by the motor 84 under the control of the reset network 115 and amplifier 90.

Considering the input circuit for the left elevon amplifier 213 it is believed that from the description of the function of the component parts in the input circuit of rudder amplifier 13 that it is apparent how a voltage drop may be derived between adjustable tap 239 and the lower end of resistor 238 of network 222. The vertical gyro banking network 241 is similar to the network 160 in the rudder input circuit of amplifier 13 and its manner of supplying voltages is also clear.

The network 251 is an arrangement whereby two potentiometers have their wipers adjusted concurrently from the directional gyro. The voltage between wiper 257 and center tap 265 depends upon the magnitude of the movement given to wiper 257 but is independent of the direction of movement. This voltage between the wiper 257 and center tap 265 is applied across the resistor 253. The voltage between wiper 254 and center tap 264 also depends upon the magnitude of the signal from the directional gyro 170 but its phase depends also upon the direction of movement. Since the voltage between wiper 254 and center tap 264 depends upon the displacement of wiper 254 with respect to the center tap 264 and also depends upon the voltage applied across the resistor 264 it is apparent that the voltage between the wiper 254 and center tap 264 varies as a non-linear function of the displacement or deviation obtained from directional gyro 170. This voltage between wiper 254 and center tap 264 varies in phase and magnitude with the direction and amount of deviation and it is applied across resistor 262. A desired portion thereof is selected between wiper 263 and the lower end of resistor 262.

The motorized directional gyro network 400 is similar to network 222 therefore it is clear how a potential may be obtained between wiper 410 and the left end of resistor 409.

The turn control aileron network 305 is a simple potentiometer arrangement with a voltage divider added similar to that in network 44 of the input circuit of rudder amplifier 13. The selected voltage drop from the turn control aileron network 305 is obtained between wiper 311 and the lower end of resistor 313 which is connected to ground. It is thus seen how the voltage drops or voltages from networks 222, 241, 251, 270 and 305 are connected in series and constitute the input circuit components to amplifier 213. Similarly the input circuit to amplifier 274 for the right elevon to provide aileron control is obtained by substituting the network 320 for the network 222 for the left elevon amplifier 213.

The servomotors 212 and 273 that operate the left elevon and the right elevon respectively are so arranged that when signals of the same phase are applied to their respective amplifiers 213 and 274 the servomotors 212 and 273 rotate in opposite directions. For example, if the centering knob is operated to move the wiper 248 to the left, the wiper 244 will be positive with respect to the wiper 248 in the half cycle under consideration. This positive or in phase signal will be applied equally to the amplifier 213 and to the amplifier 274. This in phase signal will cause the servomotor amplifier 213 to operate and cause the left elevon servomotor 212 to raise the left elevon. The servomotor 212 will adjust the servo-balance wiper 227 to the left to set up a balancing voltage in the input circuit of amplifier 213.

The right elevon amplifier 274 in response to the positive or in phase signal will cause the servomotor 273 to lower the right elevon and to move wiper 323 toward the left end of resistor 322. The wiper 323 will be adjusted until the input circuit to amplifier 274 is in balanced condition.

As the wiper 248 is moved back to the center position the decrease in the positive signal in the input circuit of amplifier 213 results in a negative unbalanced signal in that input control circuit consequently the amplifier 213 causes the servomotor 212 to rotate in the reverse direction. In the same manner the amplifier 274 responds to the preponderance of the negative signal and its input control circuit and causes the servomotor 273 to rotate in the reverse direction raising the previously lowered right elevon and moves the wiper 323 toward the center position. If wiper 248 be moved toward the right from its center position the operation of the servomotors 212 and 273 will be the reverse of that described previously.

With respect to the signal input circuit of amplifiers 213 and 274 for providing elevator operation the function of the network 351 in obtaining a voltage output is similar to that of the vertical gyro banking network 241 in the aileron input circuit.

The vertical gyro up elevator network 352 is unlike any of the previous networks. In network 352 the two ends of resistor 366 are connected to the same end of secondary winding 370. The center tap 371 of resistor 366 is connected to the adjustable tap of resistor 362. The voltage between the movable wiper 367 and the center tap 371 will not vary in phase as it is displaced from one side of center tap 371 to the other side of center tap 371 but will remain of the same phase. The magnitude of the voltage between wiper 367 and center tap 371 varies with the amount of movement of the wiper 367 and also with the adjustment given to tap 363 on resistor 362. The output of network 352 is obtained between wiper 367 and wiper 363 and does not change in phase in a particular half cycle irrespective of the direction of movements of wiper 367. The output of network 352 is in series with the output of network 351.

It was stated with respect to the amplifier input circuits to amplifiers 213, 274 that for signals of like phase the servomotors 212, and 273 would be operated in opposite directions. It is apparent, that the servomotors 212 and 273 will rotate in the same direction for opposite signals to provide elevator operation of the elevons. The resistors 342 and 341 are connected across the network 350 in order to provide opposite phased signals to amplifiers 213 and 274 as the result of an initiating signal appearing in networks 351 or 352. For example, if the wiper 359 of network 351 be moved to the left it will be negative with respect to wiper 355 in the half cycle under consideration. This difference of potential will be applied from wiper 355 to the left end of resistor 342 and from wiper 359 through network 352 to the right end of resistor 341. The circuit is thus completed through the resistors 342 and 341. The potential of the left end of resistor 342 is higher than the right end of 342. Similarly, the left end of resistor 341 will be positive with respect to the right end of resistor 341. The junction of the resistors 342 and 341 is connected to ground through the aileron input circuit. The potential of the left end of resistor 342 is applied to amplifier 213 and the potential of the right end of resistor 341 is applied to the input terminal 277 of amplifier 274. A positive or in phase voltage signal will therefore be applied to amplifier 213 whereas a negative or out of phase signal will be applied to amplifier 274. By the means thus described opposite phase signals are supplied to the amplifiers 213 and 274 to provide elevator operation of the elevons when a signal voltage is developed in either network 351 or 352.

Operation

The operation of the system may be considered when the aircraft is simply in a yawed position but that the longitudinal and pitch axes are level. The various amplifier input circuits are considered to be in a balanced condition. The single throw switch 136 is in open position with the switch arm 128 of relay 125 engaging spaced contact 130. The turn control knob 153 is in normal unoperated position at which time the relay coil 386 of relay 300 is unenergized. The switch arm 301 of relay 300 is therefore in contact with spaced contact 302.

Assuming the plane is yawed to the right. By this is meant it is headed to the right from the actual direction in which it is moving. In such condition of yaw, the vane 112 rotates in a counterclockwise direction to align itself with the direction in which the aircraft is moving. This counterclockwise rotation of vane 112 rotates the wiper 104 whereby it is moved toward the right end of resistor 103 of network 100. It is assumed with respect to every network except network 115 that the right end of the respective secondary windings are positive with respect to the left end in the particular half cycle under consideration. In network 115 the secondary is phased so that the right end thereof is negative with respect to the left end under the half cycle being considered. With wiper 104 moved toward the right the adjustable tap 109 on the trimmer potentiometer 108 is positive with respect to ground. A positive or in phase signal is applied to amplifier 90 from tap 109 through the previously described circuit to amplifier 90. The amplifier 90 causes the yaw motor 84 to rotate and position wipers 74 and 119 toward the right. The yaw rudder bridge will develop a positive or in phase voltage signal which appears across the upper end of resistor 80 and adjustable tap 81. The positive signal is applied to both amplifiers 13 and 174. It was stated previously that when a positive signal is applied to the amplifier 13 and 174 that only the servomotor 12 will operate. The servomotor 12 positions the left rudder toward open position and at the same time operates its follow up wiper 27 to balance the input circuit to amplifier 13.

It may be noted that the yaw motor 84 will rotate as long as the aircraft is in a yawed condition.

Under the applied left rudder the aircraft tends to turn toward the left about the vertical axis. The rate gyro responds to the turning of the aircraft toward the left and moves wiper 62 toward the right thereby impressing a negative signal on the input circuit of the amplifiers. Similarly the directional gyro responding to the tendency to change heading toward the left from the desired heading moves its wiper 163 toward the left thereby impressing an additional negative signal on the input control circuit of the amplifiers.

As the aircraft tends to change heading toward the left which is sensed by the directional gyro 170 the directional gyro not only moves wiper 163 of network 160 but also positions the wipers 254 and 257 in the aileron directional gyro network 251. The wipers 254 and 257 are moved toward the left to thereby impress a negative voltage which is present between the adjustable tap 263 and the lower end of resistor 262 on the input circuit of the elevon amplifiers 213 and 274.

The directional gyro rudder network 160 at this time also imposes a negative signal on the input terminals 291, 293 of amplifier 290. The amplifier 290 causes its motor 284 to rotate to move wiper 273 of network 270 toward the left. The network 270 therefore impresses a negative signal upon the input circuits to amplifiers 213 and 274.

In response to the negative voltage signal in their input circuits the amplifiers 213 and 274 operate their respective servomotors 212 and 273. In response to the negative signal the amplifier 213 causes its servomotor 212 to lower the left elevon while the amplifier 274 causes its servomotor 273 to raise the right elevon. The application of such elevon action causes the plane to bank toward the right.

In response to the bank toward the right or tilt to the right about its roll axis the vertical gyro 259 responds to such tilt. Since the plane's movement is about its roll axis the wiper 244 in the vertical gyro bank network 241 is moved toward the right. The wiper 367 in the vertical gyro up elevator network 352 is also moved toward the right. The wiper 48 in the vertical gyro rudder network 44 is moved toward the right.

The movement of wiper 244 toward the right in the vertical gyro banking network 241 causes the amplifiers 213 and 274 to operate whereby the left elevon is raised toward its normal position and the right elevon is lowered toward its normal position.

The movement of wiper 367 toward the right in the up elevator network 352 causes a negative signal to be applied to amplifier 274 and a positive signal to be applied to the input circuit of amplifier 213. In response to the negative signal the servomotor 273 raises the right elevon. In response to the plus or positive signal the amplifier 213 causes the servomotor 212 to raise the left elevon. Thus it may be seen that upon movement of the plane about the roll axis an up elevator action is applied to the elevon.

In the rudder network, the signal input circuit during the time the craft is off its desired heading is supplied with a negative signal from the directional gyro rudder network 160, the signal from the yaw rudder bridge network 70, a signal from the rate gyro network 54, and a positive signal from the vertical gyro rudder network 44. As the plane approaches the desired heading after attaining a maximum deviation the rate gyro network 54 supplies a positive signal to the input circuit of amplifiers 13 and 174. The resulting signal from network 70 is such as to cause the aircraft to fly in what is known as a coordinated turn. In a coordinated turn, the aircraft is neither skidding nor slipping or is not in a yawed attitude.

As the plane approaches the desired heading, the directional gyro 170 moves the wiper 163 of the directional gyro rudder network 160 toward the right and also moves the wipers 254 and 257 in the directional gyro aileron network 251 toward the right due to the decrease in the amount of deviation from the desired heading.

In the aileron input circuits to amplifiers 213 and 274 the movement of the wipers 254 and 257 toward the right decreases the value of the negative signal on these amplifiers which in effect leaves a preponderant positive or in phase signal in their input circuits. In response to the positive signal from the aileron network the amplifier 213 causes the servomotor 212 to raise the left elevon. The amplifier 274 on the other hand causes the right elevon servomotor 273 to lower the right elevon. Such movement of the right and left elevon causes the bank angles to the right to be decreased.

In response to the decrease in the bank angle or tilt to the right the vertical gyro 250 moves wiper 244 of network 241 toward the left. The gyro 250 also moves the wiper 367 of network 352 toward the left and a wiper 48 of the vertical gyro rudder network 44 toward the left.

The signal obtained from the vertical gyro banking potentiometer 241 at this time causes the elevons to be moved back toward center position. In the network 352 the movement of the wiper 367 toward the left causes the elevons to be moved from an up elevator position back toward normal position.

The movement of wiper 48 in the vertical gyro rudder network 44 toward the left decreases the positive signal from this network. It had been stated that while the aircraft was in a right turn that the vane 112 controlled the network 70 to provide a positioning of either rudder so that the aircraft would fly without yaw. As long as the junction of leads 40 and 194 is positive with respect to ground the servomotor 173 will not be operated by its amplifier 174. If the left rudder had been positioned while the aircraft was in the right turn in order to prevent the craft from becoming yawed, the movement of wiper 48 toward the left would in effect decrease the positive voltage operating on the input circuit with amplifiers 13 and 173. The junction of leads 40 and 194 with the left rudder operated is positive with respect to ground therefore the decrease in the positive signal in effect is a negative signal or an unbalanceable negative voltage on amplifier 13 which causes the servomotor 12 to move the left rudder toward closed position. Thus the movement of wiper 48 toward the left due to the decreased bank results in the junction of leads 40 and 194 becoming negative with respect to ground consequently the amplifier 173 causes the servomotor 174 to operate the right rudder after the left rudder has been moved to closed position.

The operation during the time that the deviation is decreasing is continuous. In this continuous operation the directional gyro through the directional gyro aileron network 251 tends to decrease the bank of the aircraft by raising the left elevon and lowering the right elevon. The vertical gyro 250 in response causes the vertical gyro banking network 241 to return the elevon toward normal.

With respect to the elevator action of the elevons the decrease in the banking angle causes the wiper 367 to be moved toward zero position and eventually causes any elevator operation of the elevon to be removed.

In the rudder networks as the deviation angle decreases and wiper 163 is moved toward the center position it reduces the negative voltage applied to the input circuits of amplifiers 13 and 174. If the amplifier 174 had caused the servomotor 173 to operate the right rudder in response to the negative potential of the junction of leads 40 and 194 in respect to ground, the decrease in the negative signal reduces the negative potential of this junction with respect to ground. The positive signal on amplifier 174 obtained from the voltage drop between adjustable tap 192 of the ratio potentiometer 190 with respect to the lower end of resistor 191 would exceed the negative voltage in the input circuit. The amplifier 174 would cause the servomotor 173 to operate and cause the right rudder to be moved toward the closed position.

As the aircraft reaches its desired heading, the wiper 163 of the directional gyro potentiometer and the wipers 254 and 257 of the directional gyro aileron potentiometer are at their center positions. The vertical gyro 250 has also moved the wipers 244, 367 and 48 back to their normal positions. The plane is now headed in its desired direction with the plane in level horizontal position. The yaw responsive vane 112 will have through motor 84 have adjusted the network 70 to provide any signal required to position the left or right rudder to remove the yaw condition of the aircraft.

If the aircraft had been yawed to the left at which time it was moving in a direction which was clockwise from its heading a similar operation would be provided to correct the plane for the yawed condition and to return it to its desired direction of flight.

The operation of the system in stabilized control to automatically compensate for unsymmetrical power will now be considered. We may assume that the plane is of the multi-engine type and that the power of a motor in the right side of the aircraft has decreased from its normal value. This sudden decrease in power of the motor on the right wing over that in the left wing causes the aircraft to veer to the right. The right wing, also due to the decrease in the velocity of the air over the wing, loses some of its effective lift and the right wing begins to drop.

As during any change in heading in automatic stabilization, the directional gyro senses the change in heading of the aircraft and displaces wiper 163 of the directional gyro rudder network 160. The rate gyro 65 also responds to the turning action of the plane about the turn axis. Wiper 163 is moved to the right of the center of resistor 164 in network 160 and wiper 62 of rate network 54 is moved to the left of the center of resistor 61. The networks 160 and 54 therefore supply a positive signal to the amplifier circuits for amplifiers 13, 174. The rebalancing networks 22 and 189 are assumed to be in balanced position and the servomotors 12 and 173 are in normal position. Therefore with the positive pulse or signal applied to the control circuits of the amplifiers 13, 174, only servomotor 12 will operate to open the left rudder to check the veering of the craft to the right.

To provide a signal which anticipates the dropping of the right wing and applies a corrective effect, the directional gyro 170 in addition to positioning wiper 163 of network 160 positions wipers 254, 257 of directional gyro aileron network 251 to the right. The signal from directional gyro rudder network 160 is also applied to the amplifier 290 which through motor 284 positions wiper 403 of aileron network 400. The wiper 403 is moved to the right and is therefore positive with respect to the center tap of resistor 405. The signal supplied to the aileron control network for amplifiers 213, 274 by network 400 is positive in character, similarly the wipers 254, 257 being moved to the right a positive signal is derived from aileron network 251 which is applied to the aileron control circuits for amplifiers 213, 274. The preponderant positive signal causes the amplifier 213 to operate its servomotor 212 to raise the left elevon. The amplifier 274 in response to the preponderant positive signal causes the servomotor 273 to lower the right elevon to increase the lift on the right wing to offset its tendency to drop. The rebalancing wiper 227 of network 224 is moved to the left to balance the control circuit for its amplifier 213. The rebalancing wiper 323 of network 322 is moved to the left by servomotor 273 to balance the control circuit for its amplifier 274.

In the aileron channels the signals from aileron networks 400 and 251 in applying a positive signal to the control circuits for amplifiers 213, 274 had caused the raising of the left elevon and the lowering of the right elevon. The plane now tilts toward the left to regain its desired heading.

The tilting of the plane to the left causes vertical flight gyro 250 to position the wiper 244 in roll axis aileron network 241, the wiper 48 in the rudder compensating network 44, and the wiper 367 in the up elevator compensating network 352.

The signal from network 352 due to the displacement of wiper 367 causes the application of up elevon to each of the elevons. The manner in which this is obtained was previously described.

The wiper 244 of the aileron network 241 being moved to the left the network 241 supplies a negative control signal to the circuit for controlling amplifiers 213, 274. The negative signal causes the amplifier 213 to effect movement of its servo 212 to lower its operated left elevon. The negative signal on amplifier 274 causes it to operate and effect rotation of servomotor 273 whereby the lowered right elevon is raised towards normal position.

The aileron network 278 which is in the control circuits for amplifiers 213, 274 is increasing the positive value of the control signal applied to such circuits.

The positioning of wiper 48 of the vertical gyro rudder network to the left by the vertical flight gyro 250 causes a negative signal to be developed across wiper 52 and the lower end of resistor 51. This negative signal causes the servomotor 12 to be operated to position the left rudder toward unoperated position.

As the aircraft approaches the desired heading, the directional gyro 170 moves wiper 163 toward the left from its right position on resistor 164. The rudder network 160 decreases the value of its positive output signal therefore the circuit controlling amplifier 13 has a preponderant negative signal. Such signal causes the amplifiers 13 and 174 to operate servomotors 12 and 173 in sequence. They move the rebalancing wipers 27 and 185 toward the right from their leftward positions. At the same time the operated left rudder is moved toward the closed position and the right rudder is opened. Due to the effect in the amount of the operated rudder the turning of the aircraft toward its desired heading decreases in rate and therefore the rate gyro signal of rate network 59 decreases. The wiper 62 which had assumed a right position due to the left turning toward desired heading now moves from its right position toward the center of resistor 61. The rate gyro signal from network 54 as the plane moves toward its desired heading sets up a decreasing negative signal opposing that provided by network 160. The rate gyro signal being decreasingly negative in character and being opposed to the positive signal from network 160 tends to cause the amplifier 173 to effect rotation of its motor 173 in such direction as to move the operated right rudder toward closed position. Should the aircraft be steadied on its heading when such heading is finally reached the directional gyro will have moved its wiper back to the center of resistor 164 and the rate gyro signal from network 54 will be zero with the wiper 58 at the center of resistor 57. The servomotor 173 will have moved wiper 185 to its extreme left position and the right rudder will have been placed in normal closed position.

As the desired heading is approached, the directional gyro moves wipers 254 and 257 to the left from their right positions. This decreases the positive signal from network 252 and causes an unbalance or preponderantly negative signal in the aileron circuits for controlling amplifiers 213, 273. The negative signal causes the amplifier 213 to operate to effect rotation of servomotor 212 whereby the left elevon is lowered. At the same time the negative signal on amplifier 274 causes it to effect rotation of servomotor 273 whereby the right elevon is raised. The aircraft under this lowered left elevon and raised right elevon tends to lessen its angular position about the roll axis.

The vertical flight gyro 250 responds to the lessening in the angular position of the aircraft and moves wiper 244 toward the right from its left position, moves wiper 367 toward the center tap 371, and moves wiper 48 toward the left or toward the center of resistor 47. Movement of wiper 244 toward the right from its left position decreases the value of the negative signal output from network 241 and the control circuits for the aileron control of amplifiers 213, 274 becomes preponderantly positive. The amplifier 213 in response to the positive signal from the aileron circuit tends to raise the left elevon from its previously lowered position. Similarly the amplifier 274 in response to the positive signal from the aileron circuit causes the servomotor 273 to lower the previously raised right elevon.

In the elevator control circuits for the amplifiers 213, 274, the decrease in the signal from network 352 causes the amplifier 213 to have a preponderantly negative signal which causes it to lower its left elevon. At the same time the decrease in the positive output of network 352 results in a decreased voltage drop across resistor 341. The decrease in the voltage drop across resistor 341 decreases the value of the negative signal derived from this resistor and in effect increases the positive voltage on amplifier 274. The amplifier 274 responds to the positive signal and lowers its right elevon through servomotor 273. The amount of up elevon which had been previously applied is thereby decreased as the aircraft approaches the desired heading. When the aircraft ultimately reaches the desired heading the vertical flight gyro 250 will have moved the wiper 367 back to center tap 371 in network 352.

The movement of wiper 48 of network 44 from its left position toward center tap 53 due to the movement of vertical gyro 250 in response to the lessening of the angular position of the aircraft about the roll axis decreases the negative signal derived from network 44. The control circuit for amplifier 174 is therefore unbalanced in a positive direction. The amplifier 174 operates and through the servomotor 173 moves the right rudder toward unoperated position. At the same time the servomotor 173 moves wiper 185 toward the left hand side of resistor 184.

When the aircraft reaches the desired heading, the directional gyro 170 will have moved wiper 163 of network 169 back to the center of resistor 164. Directional gyro 170 will also have moved wipers 254, 257 of network 251 back to the centers of their resistors 253 and 256.

Under these conditions, the impedance network 270 provides the only source of control voltage for operating the amplifiers 213, 274 to obtain aileron action. The wiper 273 of network 270 is not returned to the center of resistor 272 since it is displaced all during the time that the aircraft is in deviation and at a rate proportional to the magnitude of the deviation. The signal obtained from network 270 is positive in character and would therefore cause the amplifier 213 to operate servomotor 212 to effect the raising of the left elevon whereas the amplifier 274 is operated by a positive signal in its control circuit to cause the servomotor 273 to lower the right elevon. When the aircraft is in the desired heading; therefore, the right elevon is in lowered position and the left elevon is in a raised position. The lowering of the right elevon tends to increase the angle of incidence of the right wing and to give it increased lift whereby the tendency of the right wing to drop due to the decrease in the speed of an engine mounted in the right wing is offset.

As previously explained the circuit for effecting elevator action of the elevons has been balanced due to the fact that wiper 367 has been returned to center tap 371 as the aircraft approaches the desired heading. Therefore, the elevons will not retain their operated positions to apply elevator action when the aircraft is on desired heading.

In the rudder control circuits for the amplifiers the impedance network 160 is in balanced condition when the craft is on the desired heading. Although the craft is at this time in a level position fore and aft and laterally, due to the displaced ailerons, yet due to the unsymmetrical power applied to the plane it will still have a tendency to turn toward the right. The tendency of the craft to turn to the right while it is in level position may cause it to skid. A turn without a bank tends to cause the aircraft to skid, and therefore it is not headed in the direction in which it is moving. However, the vane 112 responds to the skidding or yawed condition of the aircraft. The vane 112 moves wiper 104 to the right from its center position on resistor 103. This movement unbalances network 100 and operates amplifier 90. Amplifier 90 on operation causes the motor 84 to position wiper 74 of network 70 toward the right. The wiper 74 will be positive with respect to center tap 78 and the upper end of resistor 80 will be positive with respect to the wiper 81. A positive signal is therefore imposed on the control circuits for amplifiers 13, 173. If the networks 20, 20' are in balanced condition, the positive pulse or signal causes the amplifier 13 to operate. The amplifier 13 causes the servomotor 12 to operate the left rudder. The servomotor 173 does not operate since in normal position it does not respond to a positive signal on amplifier 174.

The directional gyro 170 will respond also to any skidding action which tends to change the heading of the aircraft from that desired and it moves wiper 163 to the right whereby wiper 163 is positive with respect to wiper 167 and network 160. The positive signal from network 160 also causes the amplifier 13 to effect movement of the left rudder to check the tendency of the aircraft to change its heading. The application of left rudder therefore causes the aircraft to head in the desired direction.

When the aircraft is headed in the desired direction the directional gyro 170 will have moved wiper 163 back to the center of resistor 164 and no signal is obtained from network 160. However, the wiper 74 of network 70 will retain its displacement to the right despite the fact that the aircraft is not in yaw. The displacement of wiper 74 to the right of its center on resistor 73 causes a positive signal to be placed on the control circuits of amplifiers 13, 174. The amplifier 13 through its servomotor 12 causes a permanent displacement or positioning of the left rudder to correct for any tendency of the aircraft to yaw.

By the above means should unsymmetrical power develop in the aircraft it is compensated by a permanent displacement of the elevons in which one is moved to a raised position and the other one is moved to a lowered position to compensate for the tendency of the wing to drop which has suffered the loss of power. At the same time a rudder is permanently displaced to correct for any tendency of the aircraft to yaw or to change its heading due to the unsymmetrical power.

If the unsymmetrical power exists with less power in the motors arranged in the left wing, the operation is similar whereby the aircraft is restored to its original heading with compensating aileron positioning of the elevon and a permanent displacement of the rudder to correct for the tendency of the craft to yaw.

*Turn control*

If the pilot wishes to manually effect the turn of the aircraft to the right, the knob 153 is rotated to the right thereby displacing wiper 144 of network 140 to the left and wiper 308 of the aileron turn control network 305 to the left. Wiper 144 will therefore be negative with respect to the center tap 145 of resistor 143 consequently wiper 149 of the rudder trim potentiometer 142 will be negative with respect to ground. A negative signal is therefore applied to amplifiers 13, 174. Amplifier 174 responds to the negative signal, causes motor 173 to move the right rudder into operated position and rebalancing wiper 185 to balance the input circuit.

Also wiper 308 is negative with respect to the center tap 314 of resistor 307 and consequently wiper 311 of the aileron trim potentiometer 309 is negative with respect to ground. The aileron control circuit for amplifiers 213, 274, receives a negative signal. The amplifier 213 responds to the negative signal and causes its servomotor 212 to lower the left elevon; the amplifier 274 responds to the negative signal and causes its servomotor 273 to raise the right elevon. The servomotors adjust the rebalancing wipers 227, 323.

The plane now is placed in a right bank due to the positioning of the elevons and the rudder through the operation of the turn control knob. The vertical gyro 250 responds to the roll movement of the plane and moves wiper 244 towards the right and wiper 48 of the compensating network 44 to the right. The movement of wiper 244 in the aileron network 241 towards the right applies a positive signal to amplifiers 213, 274. In response to this positive signal, the servomotor 212 raises the left elevon and servomotor 273 lowers the right elevon with the consequent movement of wipers 227, 323. The positive signal in network 44 due to the movement of wiper 48 to the right applies the positive signal to amplifier 174 which causes servomotor 173 to move the right rudder toward closed position and moves rebalancing wiper 185.

The plane turns in its banked position until the desired heading is reached at which time the manual control knob 153 is moved back to zero position thereby moving wiper 144 and wiper 308 to their center positions. A positive signal is now applied to the rudder network causing the amplifiers 174 and 13 to effect rotation of servomotors 173 and 12 in sequence to close the right rudder and open the left rudder.

The positive signal in the aileron control network causes the motor 212 to raise the left elevon and motor 273 to lower the right elevon. The application of the opposite elevon causes the right wing to raise, in other words the right tilt of the plane is decreased.

The vertical flight gyro 250 responds to the decreasing in the tilt about the roll axis and moves wiper 244 toward the left from its right position and moves wiper 48 in the network 40 toward the left from its right position.

The aileron control circuit receives in effect a negative signal causing servomotor 212 to lower the left elevon and servomotor 273 to raise the right elevon. Similarly the negative voltage signal in the rudder networks causes the servomotor 12 to move the left rudder to the closed position.

At this time the craft is on the desired heading with the networks balanced and the elevons and rudders in normal position.

The vertical flight gyro also moves wiper 367 in network 352 of the elevator control network to apply up elevator to the elevons while the plane is turning and also centers the elevons as the plane is steadied on the desired heading.

The operation of the turn control knob 153 also rotates cam 380 whereby contacts 381, 382, and 383 are brought into engagement. The closing of these contacts energizes the erection cut-out coil 388, the directional arm lock coil 384, and relay operating coil 386 for the purposes previously explained.

*Resetting operation*

It is evident that the wiper 74 of the yaw rudder network 70 and the wiper 273 of the network 270 may have been displaced from their normal position. In order to reset or return these wipers to the center position of their respective resistors, the single pole switch 136 may be closed. The amplifier 90 is thereby placed under control of yaw reset network 115 which would have had its wiper 119 displaced with wiper 74. The amplifier 90 causes the motor 84 to return wipers 74 and 119 to their normal position.

The closing of switch 136 causes switch arm 127 of relay 125 to engage lower contact 133 thereby placing amplifier 290 under the control of network 400 whereby it causes the motor 284 to return the wiper 403 to normal position. The function of relay 390 may become evident at this time. If the reset switch 136 were closed while the turn control knob 153 were operated from normal position the amplifier 290 would receive a signal not only from network 400 but also from network 305. Under these circumstances the wiper 403 would not be brought back to its center position by motor 284. In order to prevent such return to other than a zero or normal position the relay 390 disassociates the network 400 from amplifier 290 while the turn control knob 153 is operated.

It is now evident that I have provided flight control apparatus which normally stabilizes the aircraft and which will correct the flight of the aircraft for conditions of yaw. This apparatus will also correct for permanent mistrim of the aircraft due to differences in power supplied from engines on opposite sides of the longitudinal axis.

Having described the preferred embodiment of my invention, but realizing that changes in the particular details described may be made without departing from the spirit of my invention, I do not wish to confine my invention to the specific structure described.

What is claimed as new is:

1. Flight control apparatus for an aircraft having means for positioning the aircraft about an axis to control the heading thereof, said apparatus comprising; actuating means for said positioning means; control means for said actuating means including a direction maintaining means responsive to deviations in heading of said aircraft and wind operated means responsive to the angular difference between the longitudinal axis of said aircraft and its direction of movement relative to the air, said difference responsive means being arranged to provide a control effect in said control means which increases with the magnitude of said difference and duration of said difference, said control effect remaining after removal of said difference whereby its control effect overrides that provided by said deviation responsive means.

2. Flight control apparatus for an aircraft having a control surface for positioning said aircraft about an axis, said apparatus comprising; control surface power means; control means for said power means; and a balanceable operating means for said control means including a control device responsive to the extent of deviation of the aircraft about said axis, a follow up second control device operated by said power means, means responsive to the magnitude of the angular difference between the heading of the aircraft and the direction of the relative air, a third control device operated in accordance with the duration and magnitude of said angular difference whereby movement of said follow up second control device renders said first and third control devices ineffective without further movement to control said control means.

3. Flight control apparatus for an aircraft having means for positioning said aircraft about two axes, actuating means for said positioning means; control means for said actuating means, one control means including means responsive to deviations of the aircraft about one axis and means responsive to the difference in heading of said aircraft from its direction of movement, said difference responsive means providing a signal which overrides said deviation signal and another control means including means responsive to said deviations of the aircraft about said one axis whereby said aircraft is turned about one axis until it is headed in the direction in which it is moving and whereby it is moved about another axis and caused to head in a desired direction.

4. Flight control apparatus for an aircraft having plural means for positioning said aircraft about its turn and roll axes; actuating means for each said positioning means; control means for each said actuating means, one control means including a controller responsive to the deviations in heading of the aircraft, a means responsive to the yawed condition of the aircraft, an operative means responsive to the yaw responsive means, and a yaw controller moved by said operative means in accordance with the duration and magnitude of yaw whereby said two controllers operate said control means; and another control means including a controller responsive to the deviations in heading of the aircraft.

5. Flight control apparatus for an aircraft having means for positioning said aircraft about an axis, said apparatus comprising; power means for said positioning means; control means for said power means including signal deriving and signal combining means; means for actuating a first signal deriving means in response to the duration and magnitude of yaw of said aircraft including operative means for positioning said signal deriving means, means for operating a second signal deriving means concurrently with said first signal means and means for controlling said operative means by said second signal means for returning said both signal deriving means to unoperated position.

6. Flight control apparatus for an aircraft having means for positioning said aircraft about an axis; actuating means for said positioning means; control means for said actuating means including a variable impedance adjusted in accordance with a yawed condition of the aircraft, relative air direction responsive means for adjusting said impedance, an operative means controlled by said impedance, and a controller connected to said operative means and moved in accordance with the magnitude and duration of the yawed condition of the aircraft; and means for disassociating said operative means from said impedance and for returning said controller to nonoperated position.

7. Flight control appaartus for an aircraft having means for positioning said aircraft about an axis; actuating means for said positioning means; control means for said actuating means, a network for operating said control means comprising a first variable impedance adjusted in accordance with the deviations of the aircraft about said axis, means responsive to the yawed condition of said aircraft, operating means controlled by said yaw responsive means, a second and a third variable impedance controlled by said operating means, a fourth impedance connected across the second impedance, connections from said first impedance to said control means and to said fourth impedance and from said fourth impedance to said control means; and connections from said third impedance to said operating means including means for rendering said yaw responsive means ineffective to control said operating means and rendering said third impedance effective to control said operating means whereby said operating means varies said second and third variable impedances.

8. In flight control apparatus for an aircraft having means for positioning said aircraft about one axis; actuating means for said positioning means; control means for said actuating means; means for operating said control means comprising; a first source of voltage varied in accordance with the deviations of the aircraft about said axis, means responsive to the yawed condition of said aircraft, operative means controlled by said yaw responsive means, a second and a third source of variable voltage controlled by said operative means, a variable impedance connected across the second source of voltage, connections from said first source to said control means and to said variable impedance, a connection from said variable impedance to said control means; connections from said third source of voltage to said operative means including means to render said yaw responsive means ineffective with respect to said operative means and to render said third source effective to control said operative means whereby said operative means reduces the value of the voltage from said second and third sources of voltage.

9. Control apparatus for a dirigible craft having control surfaces for positioning said craft about two axes; power means for said control surfaces; control means for each said power means, a control means for one power means including a controller responsive to the duration and magnitude of yaw of the craft and a second controller responsive to the deviation of the craft about one axis and a control means for the other power means including a controller responsive to the magnitude of the deviation of the craft about the said one axis and another controller responsive to the magnitude and duration of the deviation about the said one axis whereby one power means is operated to turn the craft about said one axis to remove the yaw of the craft and the other power means is operated to turn the craft about another axis to cause said deviation to be removed.

10. Flight control apparatus for an aircraft having means for positioning said aircraft about two axes, said apparatus comprising; actuating means for said positioning means; control means for each actuating means, one control means including a controller responsive to the yawed condition of said aircraft and said other control means including a controller responsive to the magnitude of the deviation of the aircraft about one axis and a second controller responsive to the magnitude and duration of the deviations of the aircraft about said axis, said deviation controller being actuated by movement of the aircraft about said one axis resulting from the operation of the yaw condition controlled positioning means.

11. Control apparatus for a craft having control surface means for positioning said craft about its roll axis, said apparatus comprising; power means for said positioning means; control means for said power means including a balanceable network, said network including a first means having a variable impedance adjusted in accordance with the deviations of the craft about its vertical axis, a second means having a variable impedance adjusted in accordance with the magnitude and duration of the deviations of the craft about said vertical axis said impedance remaining adjusted on removal of said deviations, a third means having a variable impedance adjusted in accordance with the position of the craft about said roll axis, and a follow up or rebalancing variable impedance adjusted by said power means whereby upon tendency of said craft to continue in deviation about the vertical axis the second adjusted impedance effects operation of said control means and displacement of said control surface to remove said deviations.

12. Control apparatus for an aircraft having positioning means for controlling the position of the aircraft about an axis, said apparatus comprising; actuating means for said positioning means; control means for said actuating means; means for operating said control means including a first variable impedance, a second variable impedance, a third variable impedance electrically connected across output members of said second impedance, motor operated means for adjusting said second impedance, and a fourth variable impedance controlling said motor means, electrical connections from said first impedance to said control means, from said first impedance to said third impedance, from said third impedance to said control means, and electrical connections from said third impedance to said motor means including switch means to render said fourth impedance ineffective to control said motor means and for rendering said third impedance effective to control said motor means; and additional switch means for rendering said third impedance ineffective to control said motor means upon adjustment of said first variable impedance.

13. Flight control apparatus for an aircraft having plural positioning means for controlling the position of the aircraft about its vertical and roll axes, said apparatus comprising; a power means for each said positioning means; control means for each said power means, operating means for said control means, one operating means comprising a signal combining circuit including a variable source of signal voltage including means responsive to the deviation of the aircraft about the vertical axis, a variable source of signal voltage including means responsive to the magnitude and duration of yaw of the aircraft, and a circuit rebalancing variable impedance controlled by one power means, and another operating means comprising a signal combining circuit including a variable source of signal voltage including means responsive to the deviation of the aircraft about said vertical axis, a variable source of signal voltage including means responsive to the magnitude and duration of the deviation of the aircraft about said vertical axis, and a rebalancing source of voltage controlled by the other power means.

14. Flight control apparatus for an aircraft having a rudder for controlling the heading of the aircraft, said apparatus comprising: rudder power means, control signal combining means including first and second adjustable signal controllers for controlling said power means, means responsive to the magnitude of deviation in heading of the craft for adjusting said first controller, wind controlled means responsive to the magnitude of the difference between the heading of said aircraft and its direction of movement relative to the surrounding air, and motor means controlled by said difference responsive means for adjusting said second controller by an amount dependent upon the magnitude and duration of said difference, a third controller positioned with said second controller, and switch means between said third controller and said wind controlled means on the one hand and the motor means on the other whereby said third controller may be connected to said motor means to return said second and third controllers to a normal position.

15. Control apparatus for an aircraft having control surfaces for controlling the aircraft about two axes, said apparatus comprising: power means for operating said control surfaces; a control means for each power means; means for operating each control means including a plurality of signal generating means and means for combining generated signals; attitude means responsive to movement thereof about one axis and actuating a signal generator in each operating means; course responsive means for actuating a signal generator in each operating means; and means responsive to yaw of the aircraft to actuate a signal generator in one operating means; and manually operable means for actuating a signal generator in each operating means and for rendering said course responsive means ineffective to actuate its signal generators in both operating means.

16. Control apparatus for an aircraft having a control surface for controlling the aircraft about its roll axis, said apparatus comprising: control surface power means, control means for said power means, operating means for said control means including a plurality of signal generators and means for combining generated signals; means responsive to change of heading of said aircraft for actuating a signal generator in proportion to the magnitude of said change; means for actuating a second signal generator from said heading change responsive means in proportion to the magnitude and duration of deviation, said second signal generator remaining actuated upon removal of said change in heading; and means for actuating a third signal generator from said power means.

17. Control apparatus for an aircraft having control surfaces for controlling the aircraft about two axes, said apparatus comprising: power means for operating said control surfaces; a control means for each power means; means for operating each control means including a plurality of signal generating means and means for combining generated signals; means responsive to change in heading of the craft for actuating a signal generating means in each operating means; means responsive to yaw of the craft and actuating a signal generator in one operating means in accordance with a time function of the condition of yaw, means operated by said heading responsive means for actuating a signal generator in the other operating means in accordance with a time function of change of heading, and means responsive to change in attitude of said craft for actuating a signal generator in each operating means.

18. Flight control apparatus for an aircraft having means for positioning the aircraft about an axis, said apparatus comprising: power means for said positioning means; and balanceable electrical control means for said power means including voltage generating means responsive to the difference between the heading of the aircraft and its direction of movement, operative means responsive to said difference responsive means and operated thereby at a rate proportional to said difference, a voltage generating controller positioned by said operative means in accordance with the duration and rate of movement of said operative means and a follow up voltage generating controller positioned by said power means.

ROBERT J. KUTZLER.

References Cited in the file of this patent

UNITED STATES PATENTS

| Number | Name | Date |
| --- | --- | --- |
| 1,485,781 | Ferdon | Mar. 4, 1924 |
| 1,958,258 | Alexanderson | May 8, 1934 |
| 2,280,117 | Crane et al. | Apr. 21, 1942 |
| 2,343,288 | Fink | Mar. 7, 1944 |
| 2,420,932 | Cornelius | May 20, 1947 |
| 2,463,585 | Young | Mar. 8, 1949 |